United States Patent

[11] 3,632,245

[72] Inventor: Harlan R. Getman, Toledo, Ohio
[21] Appl. No.: 36,729
[22] Filed: May 13, 1970
[45] Patented: Jan. 4, 1972
[73] Assignee: Vroman Foods, Inc., Toledo, Ohio

[54] APPARATUS FOR THE PRODUCTION OF FROZEN CONFECTIONS
8 Claims, 4 Drawing Figs.

[52] U.S. Cl. .................................................. 425/130, 141/160, 425/120, 425/126, 425/243, 425/245
[51] Int. Cl. ......................................................... A21c 3/00, A23g
[50] Field of Search ............................................. 107/1 R, 1 D, 8 R, 8 A, 8 C, 8 E, 3, 27–29; 17/32; 18/5, 39, 40; 25/7, 41; 141/160

[56] References Cited
UNITED STATES PATENTS

| | | | |
|---|---|---|---|
| 2,127,850 | 8/1938 | Taylor | 107/29 R |
| 2,850,051 | 9/1958 | Rasmusson | 107/8 A X |
| 2,866,420 | 12/1958 | Nutty | 107/1 D |
| 3,450,070 | 6/1969 | Fowler et al. | 107/27 R |
| 3,272,388 | 9/1966 | Whitmore | 107/1 D X |
| 3,468,265 | 9/1969 | Otken | 107/1 R |

Primary Examiner—Jordan Franklin
Assistant Examiner—Geo. V. Larkin
Attorney—Harry O. Ernsberger ABSTRACT: The disclosure embraces an apparatus for forming frozen confections in which movable molds are conveyed through filling, freezing, stick inserting and extraction stations, the apparatus including opened topped molds arranged in transverse rows on a conveyor system, and compartments containing liquid confection compositions connected with delivery tubes arranged to deliver metered amounts of liquid compositions simultaneously into the molds of a transverse row wherein liquid compositions of different flavors are delivered into groups of molds as the rows of molds are successively moved through the filling station.

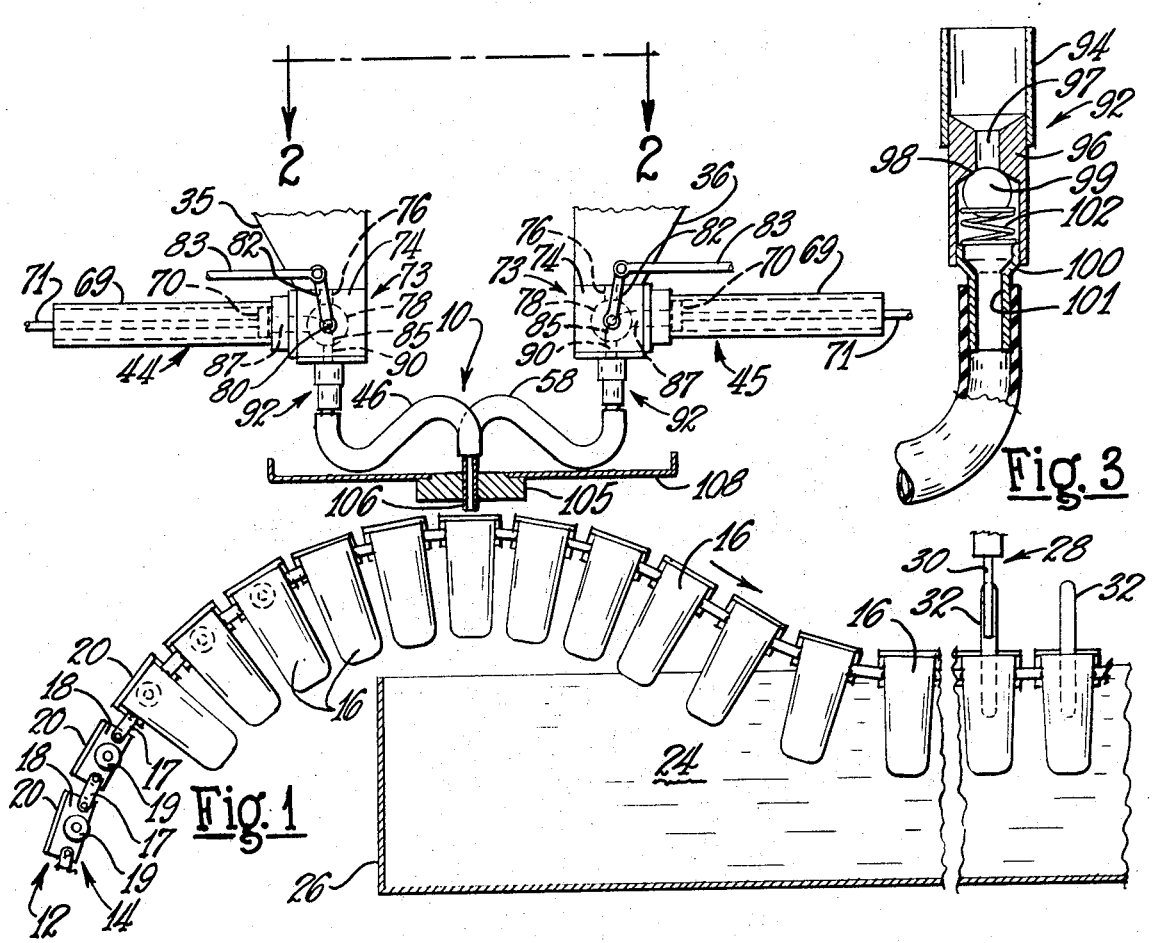
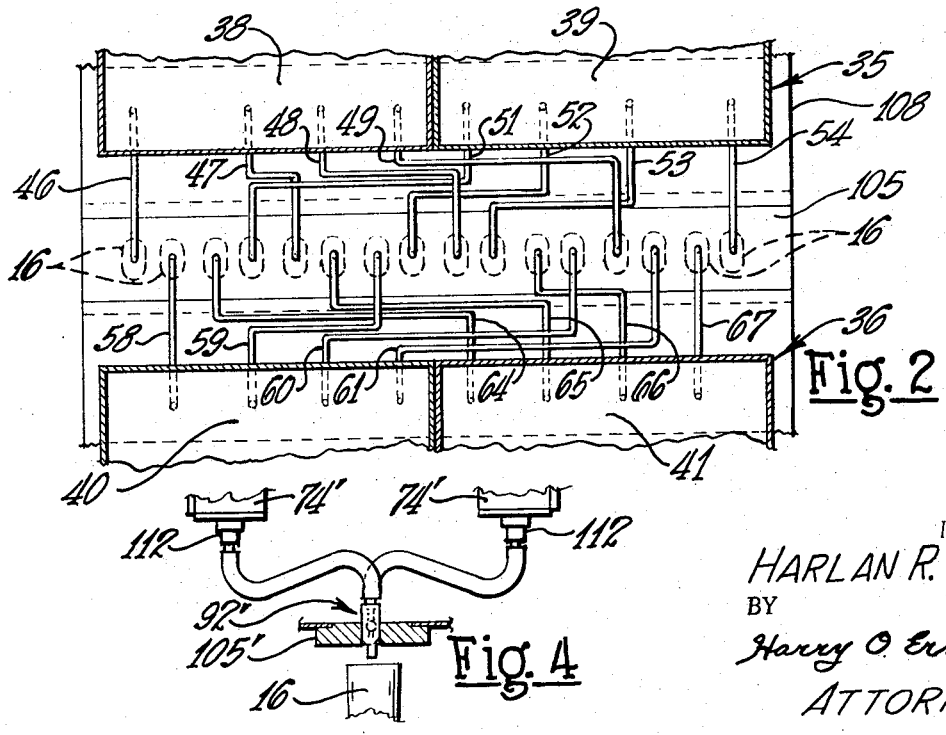

APPARATUS FOR THE PRODUCTION OF FROZEN CONFECTIONS

Heretofore, it has been conventional practice in the production of molded frozen confections wherein each confection is provided with a stick, to fill a limited number of molds in a transverse row at a filling station with a liquid confection composition contained in a single hopper. In such arrangement the molds in a row were limited to six or eight whereby production was necessarily restricted involving comparatively high cost in producing molded confections.

An object of the present invention embraces an arrangement wherein an increased number of molds is provided in each transverse row of molds in the conveyor system whereby the molds in a transverse row are simultaneously filled with liquid compositions for frozen confections, thus attaining a substantial increase in production without increasing the width of the mold conveyor system.

Another object of the invention resides in an arrangement whereby molds of a transverse row in a mold conveyor system may be concomitantly filled with liquid confection compositions from multiple supplies whereby groups of the molds of each transverse row are filled with confection compositions of different or assorted flavors.

Another object of the invention embraces an arrangement of confection composition delivery tubes wherein groups of the tubes are connected with compartments containing supplies of different or assorted flavored liquid compositions whereby the tubes simultaneously deliver compositions of different flavors into molds of a transverse row of molds and wherein the tubes may be selectively disposed or oriented for delivering different flavored confection compositions into groups of the molds in various patterns in a transverse row.

Another object of the invention resides in a structural arrangement equipped with a plurality of liquid composition delivery tubes arranged with their delivery outlets in a single transverse row for alignment with successive transverse rows of molds of a mold conveyor system whereby a large number of molds may be simultaneously filled at the filling station.

Another object of the invention resides in providing a plurality of tubes for simultaneously delivering liquid confection composition into a transverse row of molds in a mold-conveying system wherein the tubes are oriented in a configuration or shape to reduce the tendency for siphoning of the liquid composition through the tubes of more than a metered or measured quantity of liquid composition delivered into each of the tubes.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIG. 1 is a fragmentary side elevational view of a form of liquid confection composition metering and mold filling arrangement of the invention;

FIG. 2 is a schematic top plan view of the confection metering and mold-filling station, the view being taken substantially on the line 2—2 of FIG. 1;

FIG. 3 is an enlarged cross-sectional view of a check valve arrangement for interrupting flow of confection in a tube when a metered quantity of confection is delivered into the tube, and FIG. 4 is a fragmentary view illustrating a modified mold-filling tube arrangement.

Referring to the drawings and initially to FIG. 1, numeral 10 designates a mold-filling station. Disposed below the mold-filling station is a mold supporting and conveying arrangement or system 12 of conventional construction. The mold-conveying arrangement 12 is inclusive of a flexible endless conveyor 14 of articulate construction which includes an endless chain means engaging pairs of transversely spaced sprockets (not shown) of conventional construction.

Links 17 of the chain means connect adjacent brackets 18 at each side of the mold conveyor arrangement, each pair of transversely opposed brackets supporting a mold-mounting plate 20. Each of the transverse plates or strips 20 provides support means for the molds of a transverse row of open top cavity molds 16. One of the transverse rows of molds 16 is shown in broken lines in FIG. 2 at the filling station. The teeth of the pairs of sprocket wheels (not shown) engage rollers 19 carried by the brackets 18 to advance the mold-supporting conveyor arrangement 14.

The mold conveyor arrangement is intermittently advanced by a motor driven mechanism (not shown) of conventional character whereby the successive rows of molds are moved into registration with the filling station. Advancement of the mold-conveying mechanism is automatically periodically interrupted for successive dwell periods to enable the row of molds at the filling station to be filled with liquid confection compositions.

The axis of rotation of one pair of sprockets supporting the conveyor 14 is in substantially vertical alignment with the filling station whereby the molds move in a curved path as illustrated in FIG. 1 thence downwardly and longitudinally in a right-hand direction to facilitate immersion of the filled molds in a freezing liquid 24 contained and circulated in a tank or reservoir 26. As the liquid confection composition in the molds is being progressively frozen by the low temperature of the freezing liquid 24, the rows of filled molds are successively brought into registration with a stick-inserting station 28 at which a vertically reciprocating stick holder 30 inserts a stick 32 into each of the partially frozen confections.

As the molds and conveyor move in a right-hand direction as viewed in FIG. 1, the molds remain immersed in the freezing liquid 24 until the liquid confection composition is frozen to a solid state. The advancing conveyor moves in an elevated path in a conventional manner to withdraw the molds from the freezing liquid 24, the exterior mold surfaces being engaged with a hot liquid such as water or other hot environment at an extracting station and the confections removed from the molds by extractor means. As the molds are mounted on continuous endless conveyor means, the empty molds are returned by the lower flight of the conveyor (not shown) and are refilled at the filling station.

The apparatus at the filling station is arranged to concomitantly fill all of the molds of the transverse row in registration with the filling station with the liquid confection. In the arrangement illustrated, provision is made for delivering different or assorted flavors of confection liquid into different molds of a row, the delivery or distribution of the different or assorted flavors being such that the flavored confections in groups of molds in a row may be of several flavors.

As shown in FIGS. 1 and 2, the filling station is inclusive of two hoppers 35 and 36, the hopper 35 having two compartments or chambers 38 and 39, and the hopper 36 having two compartments 40 and 41. Each of the compartments 38, 39, 40 and 41 may contain a different flavored liquid composition providing different flavors of confections in groups of molds 16 at the filling station. The liquid composition, for example, may be water ice, ice cream, sherbert or other confection compositions that may be frozen into a substantially congealed state.

Associated with the compartments containing supplies of liquid confection composition are metering and distribution means for delivering metered or measured quantities of the liquid compositions into groups of molds when in registration with the filling station. In the embodiment illustrated, there is associated with the hopper construction 35 a plurality of metering pumps 44, one of which is shown in FIG. 1, the pumps 44 being arranged in transverse relation, there being a metering pump 44 for each of the confection delivery tubes associated with the compartments 38 and 39, of the hopper 35. As shown in FIG. 2, there are four composition delivery tubes 46, 47, 48 and 49 connected with the compartment 38, and four tubes 51, 52, 53 and 54 connected with the compartment 39.

There are four delivery tubes 58, 59, 60 and 61 connected with the compartment 40, and four delivery tubes 64, 65, 66 and 67 connected with the compartment or supply chamber 41. Eight metering pumps 44 are disposed adjacent the hopper 35, each pump being connected respectively with the tubes 46 through 49 and 52 through 54. A second group of metering pumps 45 is arranged adjacent the hopper 36, there being eight pumps 45, each of these pumps being connected respectively with tubes 58 through 61 and 64 through 67. The delivery tubes are of flexible plastic tubing, preferably vinyl tubing of the character marketed under the trade name "-Tygon."

The pumps 44 and 45 are of identical construction, each of the pumps including a cylinder 69 containing a reciprocable piston 70 carried by a piston rod 71, the piston rods associated with the cylinders 44 and 45 being connected with conventional means (not shown) for concomitantly moving all of the pistons in both groups of cylinders.

Associated with the hopper or liquid supply reservoir means 35 and 36 are dispensing devices 73 for dispensing liquid confection composition into the cylinders and for directing the liquid composition contained in the cylinders into the delivery tubes. As the dispensing devices associated with the hoppers 35 and 36 are identical, description of one applies to both. Positioned beneath each of the hoppers is a block 74, each block containing a valve structure, the block having a circular cylindrical bore which is in communication with the adjacent hopper by a plurality of apertures 76.

In the arrangement illustrated that are eight apertures 76 in each of the blocks 74, one for each of the cylinders 44 and 45. Rotatably disposed in each of the bores in the blocks 74 is a cylindrical valve member 78 having a shaft portion 80 extending through an opening in the end of the block 74. Secured to each shaft 80 is an arm 82 connected by a link 83 connected with actuating mechanism for rotating or operating the cylindrical valve member 78 is timed synchronism with intermittent movements of the mold conveyor 12 and the actuating movement of the pistons 70.

The valve member 78 in each block has a substantially diametrical slot 85, one for each of the eight cylinders and each block has a second group of apertures or passages 87, one for each of the adjacent cylinders. Each block has a third group of apertures or passages 90. This construction is conventional, the same being of the general character disclosed in Rasmusson U.S. Pat. No. 2,850,051. When the valve member 78 is moved to one position, the diametrical slots 85 provided communication between apertures or passages 76 and 87 whereby liquid confection composition in the compartments 38 and 39 of the hopper 35 is delivered into the cylinders as the pistons 70 in the cylinders are moved to their outermost positions.

The pistons 70 are moved a predetermined distance, which is adjustable by means (not shown) for metering the amount of liquid confection composition admitted into the cylinders from the compartments in the hopper 35. The same action takes place simultaneously with the valve means in the block 74 disposed adjacent the cylinders 45 for metering liquid confection composition from the compartments 40 and 41 of the hopper 36 into the cylinders 45.

When the cylinders 44 and 45 reach their extreme outermost positions wherein the cylinders are filled with the liquid composition, the rotatable valves 78 are moved to positions wherein the slots 85 establish communication between passages 87 and 90. When the valves 78 have been moved to this position, the pistons are actuated and move inwardly toward the blocks 74 and the liquid composition in the cylinders delivered through the passages 90 into the delivery tubes 41 through 49, 51 through 54, 58 through 61 and 64 through 67.

Means is associated disposed between the passages 90 and the respective delivery tubes embodying a check valve, one of the check valve arrangements, being shown on an enlarged scale in FIG. 3. Each check valve arrangement 92 includes a sleeve portion 94 secured secured to a lower surface of a block 74, there being a check valve for each delivery tube. A member 96 is associated with each sleeve, member 96 having a passage 97 and a seat 98 for check valve 99, the latter being ball-shaped in the embodiment illustrated.

Telescoped into the lower end of the member 96 is a fitting 100 having a nipple portion 101 to telescopingly accommodate one end of a delivery tube. A coil spring 102 normally biases the check valve or ball 99 into engagement with its seat 98. When the metering pistons 70 reach their innermost positions, the metered quantities of liquid composition in the cylinders have been delivered past the check valve means 99 and through the delivery tubes into a transverse row of molds at the filling station.

The check valve assures that on subsequent outward movements of the metering pistons, liquid composition in the supply compartments will be delivered or dispensed into the cylinders 44 and 45. In the embodiment illustrated, a plate 105 is disposed transversely of the conveyor and above a row of molds 16. The plate 105 is provided with a number of openings equal to the number of molds in a transverse row and a metal tube or tubular member 106 inserted in each opening, the lower end of each tube registering with a mold in the transverse row at the filling station.

Each of the flexible plastic delivery tubes is fitted onto the upper end of one of the tubes 106. The liquid composition flowing past the check valves 99 is conveyed by the plastic tubes to the tubular members 106 and through the outlets of members 106 into the molds of the row in registration with the members or tubes 106 whereby each mold is filled with liquid confection composition. In the embodiment illustrated, a plate or tray 108 is provided to collect condensation that may be present.

With reference to FIG. 2, there is illustrated one pattern or orientation of the flexible plastic delivery tubes wherein each mold of each group of four molds receives a different flavored composition from the respective compartments or chambers 38 through 41. Thus, in the embodiment illustrated where 16 molds are filled concomitantly at the filling station, there are four groups of molds wherein the molds of each group contain a differently flavored composition.

While the arrangement or orientation of tubes as illustrated facilitates packaging the frozen confection with four assorted flavors in each group, it is to be understood that the flexible plastic delivery tubes may be arranged in different orientations with the filler tubes 106 so that other group assortment of flavors may be attained simply through the reorientation of the plastic delivery tubes with respect to the filler tubes 106.

In operation, during movement of the mold conveyor in a right-hand direction, as viewed in FIG. 1, to bring a succeeding row of molds 16 into registration with the row of delivery tubes 106 at the filling station 10, the valves 78 are in a position establishing communication of the compartments 38 through 41 with the cylinders of the metering pumps 44 and 45 and the pistons 70 are moving outwardly to fill the cylinders with liquid compositions from the compartments.

During the dwell period of the mold conveyor, the valves 78 are moved to a position establishing communication between the cylinders 69 and the passages 90, the pistons 70 moved toward the blocks 74 and the liquid compositions in the cylinders delivered past the check valves 99 through the flexible plastic tubes 46 to 49, 51 to 54, 58 to 61 and 64 to 67 and through the tubes 106 into the molds of the row at the filling station.

During each dwell period, the stick-inserting member 30 is actuated in the well-known manner to insert a stick 32 into the partially frozen or viscous composition in each of the molds of the row in registration with the stick-inserting station 28. The molds are maintained in the freezing liquid for a distance sufficient to assure freezing of the confection composition, the molds then moved out of the freezing liquid and the frozen confections extracted from the molds in a conventional manner.

A modification of the positioning of the check valve arrangements is illustrated in FIG. 4. In this form there is secured to the lower portion of each of the blocks 74' a fitting 112, the number of fittings being equal to the number of flexible plastic delivery tubes to be connected to the blocks. The plate 105' is fashioned with openings, one for each mold of a transverse row, each opening accommodating a check valve arrangement 92' of the character shown in detail in FIG. 3. In this form, the outlets of the check valve arrangements are disposed above the open molds at the filling station whereby liquid confection compositions delivered through the tubes flows past the check valves and into the several molds of a transverse row of molds.

It is to be understood that the flexible delivery tubes may be oriented in different patterns for connection with the check valve fittings 92 so that groups of molds may contain different flavors other than through the arrangement of delivery tubes shown in FIG. 2.

It is apparent that, within the scope of the invention, modifications and different arrangements may be made other than as herein disclosed, and the present disclosure is illustrative merely, the invention comprehending all variations thereof.

I claim:

1. Apparatus for producing frozen confection including, in combination, longitudinally spaced mold-mounting members in substantially parallel relation, each of said members mounting a row of open-topped molds, conveyor means for advancing said mold-mounting members and molds along a longitudinal path, a pair of liquid reservoir means disposed adjacent the mold-conveying means, a plurality of first metering devices connected with one of said liquid reservoir means, a plurality of second metering devices connected with the other reservoir means, a relatively stationary plate disposed above and transversely to the longitudinal path of movement of the mold conveyor means, said plate having a plurality of openings arranged in a single row, there being an opening for registration with each of the molds of a transverse row of molds, and a plurality of tubes, each individual tube being disposed to receive liquid from one of said metering devices and terminating in registration with one of the openings in said stationary plate for delivering liquids from said metering devices into the molds of a transverse row adjacent the plate.

2. The combination according to claim 1 including check valve means disposed between each of the metering devices and the liquid delivery region provided by each of the openings in the plate.

3. Apparatus for producing frozen confection including, in combination, longitudinally spaced mold-mounting members in substantially parallel relation, each of said members mounting a row of open-topped molds, conveyor means for advancing said mold mounting plates and molds along a longitudinal path, a pair of liquid reservoir means disposed adjacent the mold-conveying means, a plurality of first metering devices connected with one of said liquid reservoir means, a plurality of second metering devices connected with the other reservoir means, a relatively stationary plate disposed transversely to the longitudinal path of movement of the mold conveyor means, said plate having a plurality of openings arranged in a single row, there being an opening for registration with each of the molds in a transverse row of molds for delivering liquid into said molds of the row in registration with the openings, tubular means individual to each metering device for conveying liquid from said first and second metering devices to a region adjacent each opening in the plate, and check valve means connected with each of said tubular means and disposed adjacent each opening in the plate, each of said check valve means having an orifice through which liquid is delivered into a mold.

4. Apparatus for producing frozen confection including, in combination, longitudinally spaced mold-mounting members, each of said members mounting a row of open-topped molds, conveyor means for intermittently advancing said mold mounting members and molds carried thereby along a longitudinal path to a mold filling station, liquid reservoir means disposed adjacent the mold-conveying means, said reservoir means including a plurality of chambers, each chamber adapted to contain a supply of liquid confection composition, a plurality of groups of metering devices, there being a group of said metering devices connected with each of said supply chambers, a relatively stationary plate at the mold filling station disposed above and transversely to the longitudinal movement of the mold conveyor means, said plate having a plurality of openings arranged in a single row, there being an opening for registration with each of the molds of a transverse row of molds for delivering liquid into the said molds of the row, and a plurality of liquid conveying tubes, each of said tubes terminating adjacent one of the openings in the relatively stationary plate, groups of said tubes being connected with groups of the metering devices to effect delivery of liquids from the respective chambers through the groups of metering devices and groups of tubes into groups of molds of a row whereby each mold of a group receives liquid composition from one of said chambers, and individual check valve means connected with each of said tubes.

5. The combination according to claim 4 wherein the check valve means for each tube is disposed adjacent the metering device for the said tube.

6. The combination according to claim 4 wherein the check valve means for each tube is supported adjacent an opening in the relatively stationary plate at the filling station.

7. Apparatus for producing frozen confection including, in combination, longitudinally spaced mold-mounting members, each of said members mounting a row of 16 open-topped molds, conveyor means for advancing the members and molds carried thereby along a longitudinal path, liquid reservoir means disposed adjacent the mold-conveying means, said reservoir means including a pair of hoppers, each hopper being partitioned to provide two liquid composition supply chambers, a plurality of metering devices associated with each of the hoppers, there being a group of four metering devices connected with each of said chambers, a relatively stationary plate disposed above and extending transversely to the longitudinal movement of the mold conveyor means, said member having 16 spaced openings arranged in a single row wherein each opening is arranged for registration with a mold of a transverse row of molds, a plurality of tubes for conveying liquid composition for delivery into the molds of a row, each of said tubes being connected with one of the metering devices whereby groups of four molds in a row receive liquid composition from one of the chambers, and check valve means connected with each liquid-conveying tube.

8. The combination according to claim 7 wherein the liquid-conveying tubes are arranged whereby four consecutive molds of each group receive liquid composition from a different chamber.

* * * * *